United States Patent
Styles et al.

(10) Patent No.: US 9,366,178 B2
(45) Date of Patent: *Jun. 14, 2016

(54) METHOD AND SYSTEM FOR EXHAUST GAS RECIRCULATION

(71) Applicant: Ford Global Technologies, LLC, Dearborn, MI (US)

(72) Inventors: Daniel Joseph Styles, Canton, MI (US); Brad Alan Boyer, Canton, MI (US); Satheesh Makkapati, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 193 days.

This patent is subject to a terminal disclaimer.

(21) Appl. No.: 14/203,122

(22) Filed: Mar. 10, 2014

(65) Prior Publication Data

US 2014/0190160 A1    Jul. 10, 2014

Related U.S. Application Data

(63) Continuation of application No. 13/188,895, filed on Jul. 22, 2011, now Pat. No. 8,726,658.

(51) Int. Cl.
| | |
|---|---|
| *F02B 33/44* | (2006.01) |
| *F02B 33/00* | (2006.01) |
| *F02M 25/07* | (2006.01) |

(Continued)

(52) U.S. Cl.
CPC ............ *F02B 37/12* (2013.01); *F02M 25/0709* (2013.01); *F02M 25/0711* (2013.01); *F02M 25/0713* (2013.01); *F02B 29/0406* (2013.01); *F02B 33/00* (2013.01); *F02B 33/40* (2013.01); *F02B 33/446* (2013.01); *F02B 37/001* (2013.01); *F02B 37/007* (2013.01); *F02B 37/013* (2013.01);

(Continued)

(58) Field of Classification Search
CPC .......... F02M 25/0711; F02M 25/0713; F02M 25/0709; F02M 2025/0769; F02B 37/00; F02B 37/007; F02B 37/02; F02B 1/04; F02B 37/013; F02B 37/18; F02B 37/16; F02B 33/00; F02B 33/40; F02B 33/446; F02F 1/4214; F02F 2001/245; F01N 13/107; Y02T 10/121; Y02T 10/144
USPC .................... 60/605.2, 612; 123/562, 568.22, 123/568.19, 568.27, 568.32
See application file for complete search history.

(56) References Cited

U.S. PATENT DOCUMENTS

| | | | |
|---|---|---|---|
| 1,860,449 | A | 5/1932 | Buchi |
| 4,171,691 | A | 10/1979 | Nohira et al. |

(Continued)

FOREIGN PATENT DOCUMENTS

| | | | |
|---|---|---|---|
| JP | H03138420 | A | 6/1991 |
| JP | H03229921 | A | 10/1991 |

(Continued)

*Primary Examiner* — Thai Ba Trieu
(74) *Attorney, Agent, or Firm* — Julia Voutyras; Alleman Hall McCoy Russell & Tuttle LLP

(57) ABSTRACT

Methods and systems are provided for an engine including a first turbocharger having a first compressor and a second turbocharger having a second compressor. An EGR differential between the first compressor and the second compressor may be increased under a condensation condition, and decreased under a surge condition. The EGR differential may also be decreased when a compressor outlet temperature exceeds an outlet temperature threshold.

19 Claims, 3 Drawing Sheets

(51) Int. Cl.
  *F02B 47/08* (2006.01)
  *F02B 37/12* (2006.01)
  F02B 33/40 (2006.01)
  F02B 37/007 (2006.01)
  F02B 37/013 (2006.01)
  F02B 37/16 (2006.01)
  F02B 37/18 (2006.01)
  F02B 29/04 (2006.01)
  F02B 37/00 (2006.01)

(52) U.S. Cl.
  CPC .............. *F02B 37/16* (2013.01); *F02B 37/18* (2013.01); *Y02T 10/121* (2013.01)

(56) References Cited

U.S. PATENT DOCUMENTS

| | | |
|---|---|---|
| 4,398,525 A | 8/1983 | Ahrns et al. |
| 4,462,351 A | 7/1984 | Fujii et al. |
| 5,069,194 A | 12/1991 | Deutschmann et al. |
| 6,202,414 B1 | 3/2001 | Schmidt et al. |
| 6,675,782 B1 | 1/2004 | Persson |
| 6,917,873 B2 | 7/2005 | Itoyama |
| 7,107,761 B2 | 9/2006 | Fukuma et al. |
| 7,165,403 B2 | 1/2007 | Sun et al. |
| 7,509,805 B2 | 3/2009 | Kalrsson |
| 7,703,284 B2 | 4/2010 | Becker et al. |
| 8,726,658 B2 * | 5/2014 | Styles et al. ............. 60/605.2 |
| 2006/0174621 A1 | 8/2006 | Chen et al. |
| 2008/0034752 A1 | 2/2008 | Becker et al. |
| 2008/0190108 A1 | 8/2008 | Eitel et al. |
| 2010/0024416 A1 | 2/2010 | Gladden et al. |
| 2011/0289919 A1 | 12/2011 | Oyagi et al. |
| 2012/0227714 A1 | 9/2012 | Surnilla et al. |
| 2012/0227719 A1 | 9/2012 | Surnilla et al. |

FOREIGN PATENT DOCUMENTS

| | | |
|---|---|---|
| JP | H04318226 A | 11/1992 |
| JP | 2010112287 A | 5/2010 |

* cited by examiner

METHOD AND SYSTEM FOR EXHAUST GAS RECIRCULATION

CROSS REFERENCE TO RELATED APPLICATIONS

The present application is a continuation of U.S. patent application Ser. No. 13/188,895, "METHOD AND SYSTEM FOR EXHAUST GAS RECIRCULATION," filed on Jul. 22, 2011, the entire contents of which are hereby incorporated by reference for all purposes.

FIELD

The present application relates to control systems for exhaust gas recirculation in a turbocharged engine system.

BACKGROUND AND SUMMARY

Engine systems may utilize one or more turbochargers to compress ambient intake air entering the engine to provide increased power output. Turbocharged engine systems may also be configured with one or more high-pressure and/or low-pressure exhaust gas recirculation (EGR) systems that recirculate at least a portion of the exhaust gas to the engine intake. In an engine system utilizing two turbochargers operating in parallel, separate EGR systems may be associated with each turbocharger. Utilizing separate EGR systems necessitates a footprint and packaging space large enough to accommodate components for both EGR systems.

With respect to a typical low-pressure EGR system in a turbocharged engine, a potential issue can arise when certain environmental conditions exist, such as low ambient air temperature and/or high humidity conditions. Under these conditions, water vapor condensation may form on internal surfaces of engine components, such as the charge air and EGR air coolers, when those surfaces are cooler than the saturation temperature (dew point) of the exhaust gas and/or exhaust gas/charge air mixture. Under certain operating conditions such as hard accelerations, the condensation may be dislodged, for example, from the EGR air cooler and may travel into a turbocharger compressor, potentially damaging compressor components. The condensation may also continue into the combustion chambers of the engine causing performance issues, such as torque and engine speed losses, engine misfires and incomplete fuel burn.

A low-pressure EGR system also increases the intake air temperature that is experienced by the compressor. If not controlled properly, the compressor outlet temperature may rise to levels that can degrade compressor components. A low-pressure EGR system may also contribute to a compressor surge condition, in which an unstable and inefficient air flow condition can reduce compressor performance and potentially damage compressor components.

The inventors herein have recognized the above issues, as well as various solutions to address them.

In one example, the above issues may be at least partly addressed by a method of operating an engine including a first turbocharger having a first compressor and a second turbocharger having a second compressor. In one embodiment, the method comprises increasing an EGR differential between the first compressor and the second compressor under a condensation condition, and decreasing the EGR differential between the first and second compressors under a surge condition.

For example, when a condensation condition exists, such as when an air intake temperature is below an intake temperature threshold, the EGR differential between the first compressor and the second compressor may be increased by reducing exhaust gas flow to the second compressor, and correspondingly increasing exhaust gas flow to the first compressor. In this manner, the amount of heated exhaust gas combined with intake air is increased, thereby increasing the air intake temperature at the compressor inlet and reducing the likelihood of condensation accumulation.

When a surge condition exists, such as when an estimated manifold pressure exceeds a pressure threshold and an estimated air flow downstream from the first compressor is below an air flow threshold, the EGR differential between first compressor and the second compressor may be decreased by increasing exhaust gas flow to the second compressor, and correspondingly decreasing exhaust gas flow to the first compressor. In this manner, the amount of exhaust gas combined with intake air is decreased, thereby decreasing the air flow into the first compressor inlet and reducing the likelihood of compressor damage due to a surge condition.

In another example, when an estimated compressor outlet temperature exceeds an outlet temperature threshold associated with potential damage to compressor components, the EGR differential between the first compressor and the second compressor may be decreased by increasing exhaust gas flow to the second compressor, and correspondingly decreasing exhaust gas flow to the first compressor. In this manner, the amount of heated exhaust gas combined with intake air is decreased, thereby decreasing the air intake temperature at the first compressor inlet and correspondingly decreasing the compressor outlet temperature, and reducing the likelihood of compressor degradation due to high temperatures.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
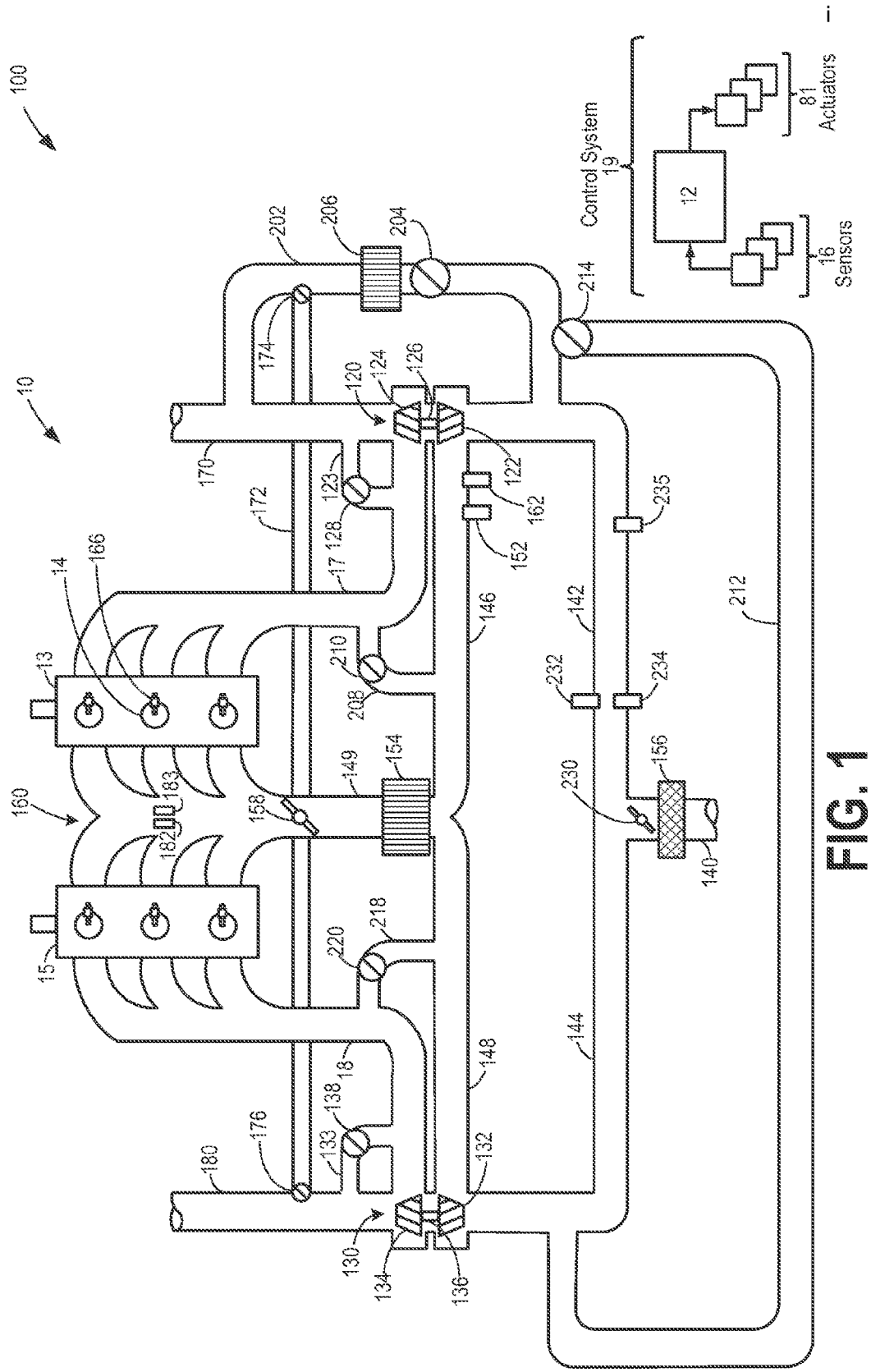
FIG. 1 shows a schematic depiction of an example engine system and an associated EGR system.
Figure 2:
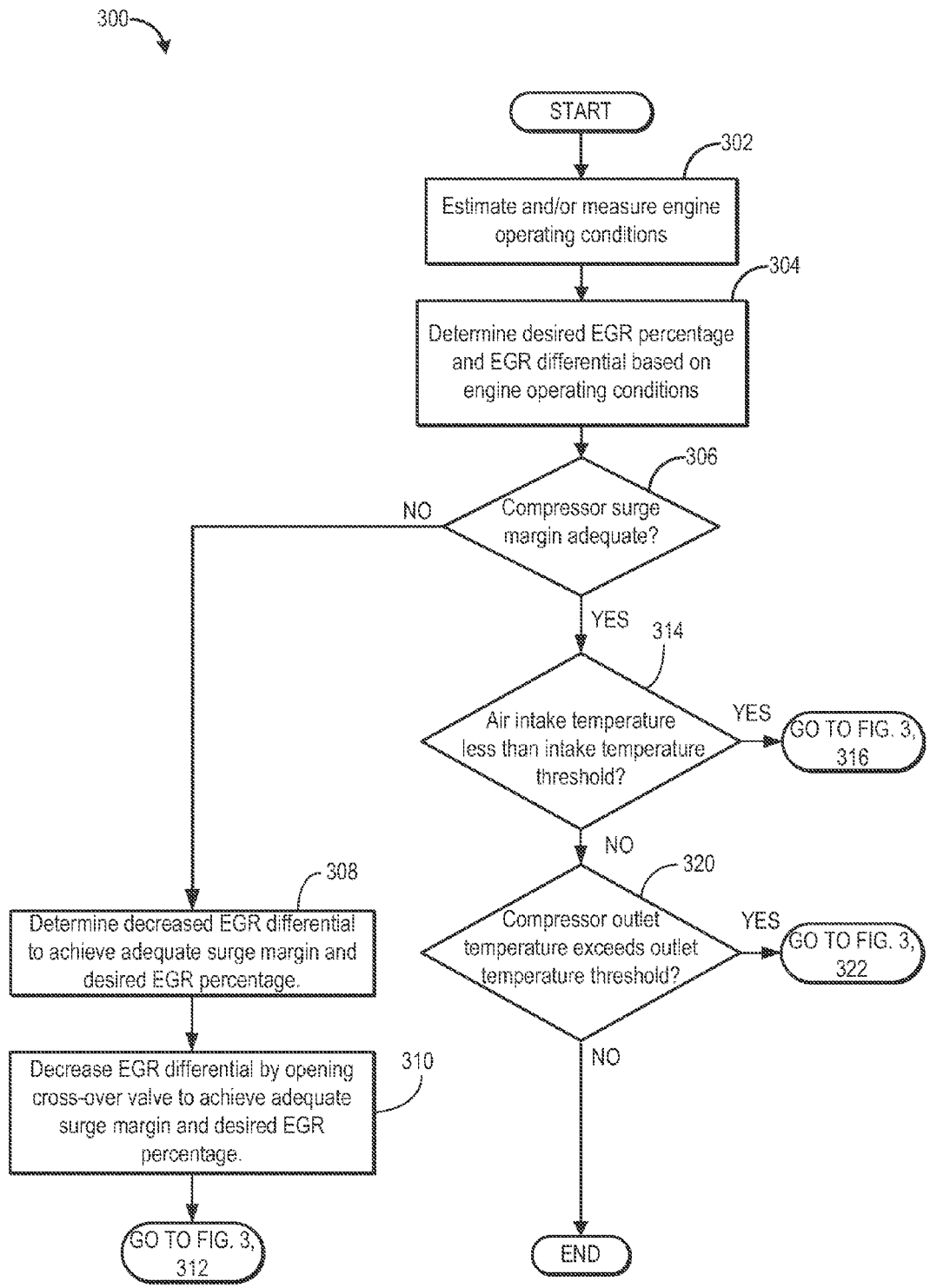
FIG. 2 shows a high level flow chart for adjusting engine EGR flow based on condensation, air intake temperature and/or surge conditions.
Figure 3:
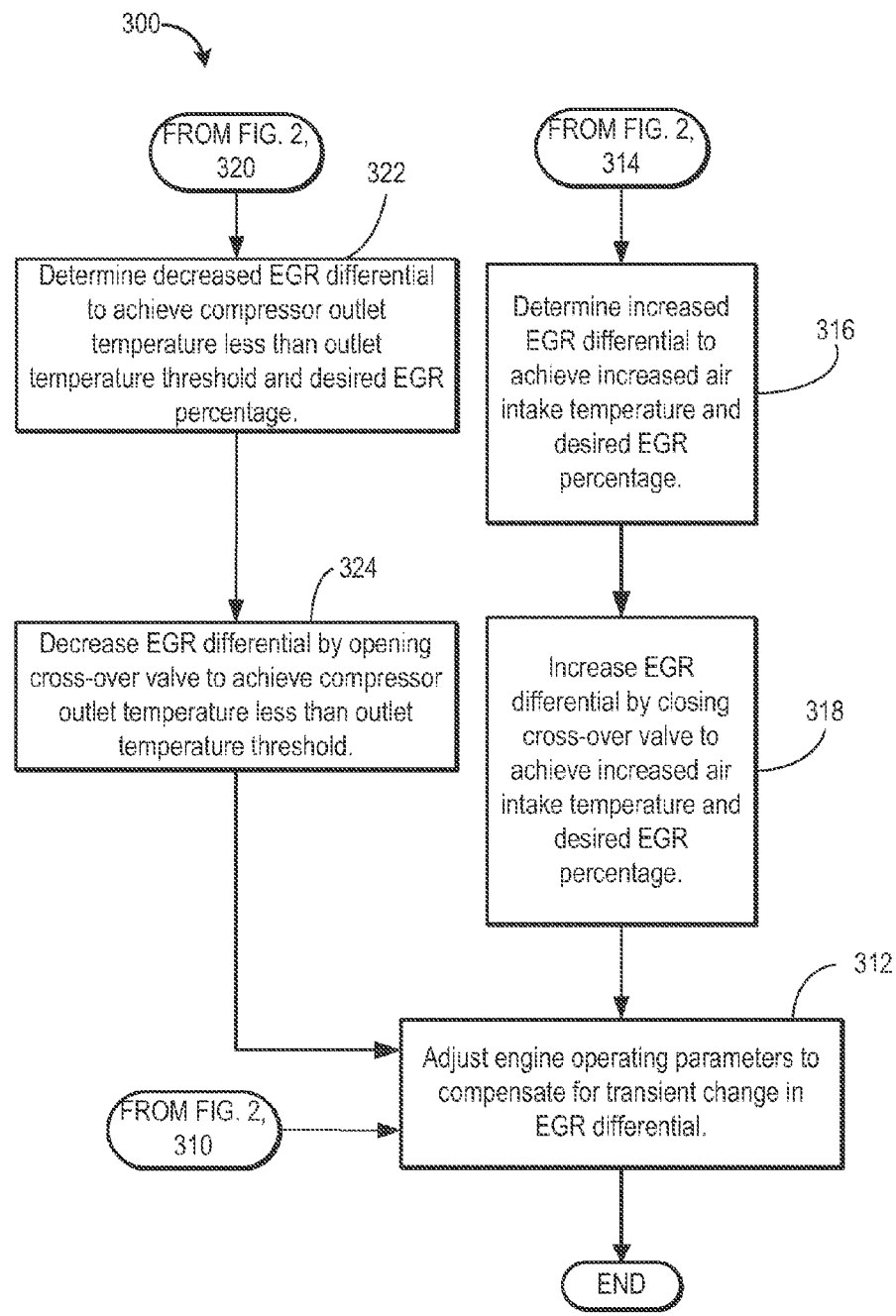
FIG. 3 is a continuation of the high level flow chart of FIG. 2.

The following description relates to systems and methods for operating an engine including a first turbocharger having a first compressor and a second turbocharger having a second compressor (FIG. 1). Based on engine operating conditions, a desired EGR percentage and an EGR differential may be determined (FIG. 2). Further, based on a determination of whether an adequate surge margin exists, whether an air intake temperature is less than an intake temperature threshold, and whether a compressor outlet temperature exceeds an outlet temperature threshold, an EGR differential may be adjusted (FIGS. 2-3).

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156 and a first air intake throttle valve 230. Engine system 100 may be a split-engine system wherein intake passage 140 is branched downstream of first air intake throttle valve 230 into first and second parallel intake passages, each including a turbocharger compressor. Specifically, at least a portion of intake air is directed to compressor 122 of turbocharger 120 via a first parallel intake passage 142 and at least another portion of the intake air is directed to compressor 132 of turbocharger 130 via a second parallel intake passage 144 of the intake passage 140.

The first portion of the total intake air that is compressed by compressor 122 may be supplied to intake manifold 160 via first parallel branched intake passage 146. In this way, intake passages 142 and 146 form a first parallel branch of the engine's air intake system. In some examples, the first parallel branched intake passage 146 may also include a mass air flow sensor (MAF) 152 for estimating an air flow downstream of the compressor 122, and/or a compressor outlet temperature sensor 162 for estimating a compressor outlet temperature, each communicating with a controller 12 that forms par of a control system 19. Similarly, a second portion of the total intake air can be compressed via compressor 132 where it may be supplied to intake manifold 160 via second parallel branched intake passage 148. Thus, intake passages 144 and 148 form a second parallel branch of the engine's air intake system. As shown in FIG. 1, intake air from intake passages 146 and 148 can be recombined via a common intake passage 149 before reaching intake manifold 160, where the intake air may be provided to the engine.

A first air intake throttle valve 230 may be positioned in the engine intake upstream of the first and second parallel intake passages 142 and 144, while a second air intake throttle valve 158 may be positioned in the engine intake downstream of the first and second parallel intake passages 142 and 144, and downstream of the first and second parallel branched intake passages 146 and 148, for example, in common intake passage 149.

In some examples, intake manifold 160 may include an intake manifold pressure sensor 182 for estimating a manifold pressure (MAP) and communicating with controller 12. The MAP signal from manifold pressure sensor 182 may be used to provide an indication of vacuum, or pressure, in the intake manifold. In other examples, the MAP may be estimated based on other operating parameters, such as inducted mass air flow (MAF) and engine speed (RPM), for example. The intake manifold 160 may also include an intake manifold temperature sensor 183 for estimating a manifold air temperature (MAT) and communicating with controller 12. Intake passage 149 can include an air cooler 154 and/or a throttle (such as second throttle valve 158). The position of throttle valve 158 can be adjusted by the control system 19 via a throttle actuator 81 communicatively coupled to controller 12.

Engine 10 may include a plurality of cylinders 14. In the depicted example, engine 10 includes six cylinders arrange in a V-configuration. Specifically, the six cylinders are arranged in two banks 13 and 15, with each bank including three cylinders. In alternate examples, engine 10 can include two or more cylinders such as 4, 5, 8, 10 or more cylinders. These various cylinders may be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (hereinafter, also referred to as combustion chamber 14) via common intake passage 149 may be used for fuel combustion, and products of combustion may then be exhausted via bank-specific parallel exhaust passages. In the depicted example, a first bank 13 of cylinders of engine 10 can exhaust products of combustion via a first parallel exhaust passage 17 and a second bank 15 of cylinders can exhaust products of combustion via a second parallel exhaust passage 18. Each of the first and second parallel exhaust passages 17 and 18 may deliver the products of combustion in the form of exhaust gas to a turbocharger turbine. Specifically, exhaust gas that is exhausted via exhaust passage 17 can be directed through exhaust turbine 124 of turbocharger 120, which in turn can provide mechanical work to drive compressor 122 via shaft 126 in order to provide compression to the intake air. Alternatively, some or all of the exhaust gases flowing through exhaust passage 17 can bypass turbine 124 via turbine bypass passage 123 as controlled by a wastegate 128. Similarly, exhaust gas that is exhausted via exhaust passage 18 can be directed through exhaust turbine 134 of turbocharger 130, which in turn can provide mechanical work to drive compressor 132 via shaft 136 in order to provide compression to intake air flowing through the second branch of the engine's intake system. Alternatively, some or all of the exhaust gas flowing through exhaust passage 18 can bypass turbine 134 via turbine bypass passage 133 as controlled by a wastegate 138.

Exhaust gas temperature may be estimated by one or more temperature sensors (not shown) located in exhaust passages 17 and/or 18. Alternatively, exhaust temperature may be inferred based on one or more engine operating conditions such as speed, load, air-fuel ratio (AFR), spark retard, etc. It will be appreciated that the exhaust gas temperature may also be estimated by any combination of temperature estimation methods listed herein.

In some examples, exhaust turbines 124 and 134 may be configured as variable geometry turbines, wherein controller 12 may adjust the position of the turbine impeller blades (or vanes) to vary the amount of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the amount of energy that is obtained from the exhaust gas flow and imparted to their respective compressor. For example, the control system 18 can be configured to independently vary the vane or nozzle position of the exhaust gas turbines 124 and 134 via respective actuators 81.

Exhaust gases in first parallel exhaust passage 17 may be directed to the atmosphere via branched parallel exhaust passage 170 while exhaust gases in second parallel exhaust passage 18 may be directed to the atmosphere via branched parallel exhaust passage 180. Exhaust passages 170 and 180 may also include one or more exhaust after-treatment devices, such as a catalyst, and one or more exhaust gas sensors (not shown).

Engine 10 may further include one or more exhaust gas recirculation (EGR) passages, or loops, for recirculating at least a portion of exhaust gas from one or more exhaust passages to one or more intake passages. These EGR loops may include high-pressure EGR loops for proving high-pressure EGR (HP-EGR) and low-pressure EGR-loops for providing low-pressure EGR (LP-EGR). In one example, HP-EGR may be provided in the absence of boost provided by turbochargers 120, 130. In other examples, and as described in more detail below, LP-EGR may be provided in the presence of turbocharger boost. In still other examples, both HP-EGR and LP-EGR may be provided simultaneously.

In the depicted example, engine 10 may include a first high-pressure EGR loop 208 for recirculating at least some exhaust gas from the first parallel exhaust passage 17, upstream of the turbine 124, to the first branched parallel intake passage 146, downstream of the compressor 122. EGR flow through HP-EGR loop 208 may be controlled via an HP-EGR valve 210. Similarly, engine 10 may also include a second high-pressure EGR loop 218 for recirculating at least some exhaust gas from the second parallel exhaust passage 18, upstream of the turbine 134, to the second branched parallel intake passage 148, downstream of the compressor 132. EGR flow through HP-EGR loop 218 may be controlled via an HP-EGR valve 220.

In the depicted example, engine 10 further includes a single LP-EGR loop 202 associated with the first turbocharger 120 and fluidically coupling the first branch exhaust passage 170, downstream of the turbine 124, to the first parallel intake passage 142 upstream of the compressor 122. In this manner, the LP-EGR loop 202 recirculates at least some exhaust gas from the first branched parallel exhaust passage 170 to the compressor 122. The LP-EGR loop 202 may include an LP-EGR valve 204 for controlling an EGR flow (i.e., an amount of exhaust gas recirculated) through the loop, and an EGR cooler 206 for lowering a temperature of exhaust gas flowing through the EGR loop 202 before recirculation into the engine intake passage 142. In the depicted example, it will be appreciated that the engine 10 includes only one EGR loop 202 that is associated with the first turbocharger 120, and does not include a second EGR loop associated with the second turbocharger 130. In this manner, the additional packaging space, weight, and component costs of a second EGR loop may be avoided.

In the depicted example, the engine 10 also includes an EGR cross-over loop 212 that fluidically couples the LP-EGR loop 202, downstream from the EGR cooler 206, to the second parallel intake passage 144 upstream of the compressor 132 of the second turbocharger 130. A cross-over valve 214 fluidically couples the EGR cross-over loop 212 to the LP-EGR loop 202, and may be controlled by controller 12. As explained in more detail below, the cross-over valve 214 and associated EGR exhaust gas flow through the EGR cross-over loop 212 may be controlled to vary the amounts and/or percentages of EGR exhaust gas delivered to the compressors 122 and 132. In other words, the cross-over valve 214 and associated EGR exhaust gas flow through the EGR cross-over loop 212 may be controlled to increase or decrease an amount/percentage of EGR exhaust gas delivered to compressor 122 as compared to an amount/percentage of EGR exhaust gas delivered to compressor 132, with such comparative amount/percentage hereinafter referred to as an EGR differential.

In the depicted example, engine 10 also includes a backpressure balance passage 172 that fluidically couples the EGR loop 202 to the branched parallel exhaust passage 180. The backpressure balance passage 172 may include a first backpressure valve 174 that fluidically couples the passage to the EGR loop 202, and a second backpressure valve 176 that couples the passage to the branched parallel exhaust passage 180, with both valves 174, 176 controlled by controller 12. The backpressure balance passage 172 may function to balance differences in backpressure between the branched parallel exhaust passage and associated turbine 134, and the EGR loop 202 and the associated turbine 124.

Humidity sensor 232, pressure sensor 234, and temperature sensor 235 may be included in one or both of the parallel intake passages (herein, depicted in the first parallel intake air passage 142 but not in the second parallel intake passage 144), downstream of a first air intake throttle valve 230. Humidity sensor 232 may be configured to estimate a relative humidity of the intake air by detecting a water vapor concentration of air entering the intake passage 140. Pressure sensor 234 may be configured to estimate a pressure of the intake air upstream from the compressor 122. Temperature sensor 235 may be configured to estimate the temperature of air entering the intake air passage 142.

Engine system 100 may be controlled at least partially by a control system 19 including controller 12 and by input from a vehicle operator via an input device (not shown). Control system 19 is shown receiving information from a plurality of sensors 16, various examples of which are described herein, and sending control signals to a plurality of actuators 81, various examples of which are also described herein. As one example, sensors 16 may include humidity sensor 232, intake air pressure sensor 234, intake air temperature sensor 235, MAF sensor 152, compressor outlet temperature sensor 162, MAP sensor 182, and MAT sensor 183. In some examples, common intake passage 149 may include a throttle inlet pressure (TIP) sensor for estimating a throttle inlet pressure (TIP) and/or a throttle inlet temperature sensor for estimating a throttle air temperature (TCT). In other examples, one or more of the EGR loops may include pressure, temperature, and/or air-to-fuel ratio sensors for determining EGR flow characteristics. As another example, actuators 81 may include fuel injectors 166, HP-EGR valves 210 and 220, LP-EGR valve 204, throttle valves 158 and 230, backpressure balance valves 174 and 176, and wastegates 128 and 138. Other actuators, such as a variety of additional valves and throttles, may be coupled to various locations in engine system 100.

Controller 12 may include a processor, random access memory (RAM) and read-only memory (ROM) (not shown). In one example, the ROM may be programmed with computer readable data representing instructions executable by the processor for performing the methods described herein. Controller 12 may receive input data from one or more sensors 16, process the input data, and trigger one or more actuators 81 in response to the processed input data based on instructions or code programmed therein corresponding to one or more routines. Controller 12 may also receive various signals from other sensors coupled to engine 10, in addition to those signals previously discussed, including, for example, measurement of engine coolant temperature, a profile ignition pickup signal (PIP), and throttle position (TP) from a throttle position sensor. An engine speed signal, RPM, may also be generated by controller 12 from a PIP signal, for example. Further, crankshaft position, as well as crankshaft acceleration, and crankshaft oscillations may also be identified based on the PIP signal.

FIG. 2 illustrates an example method 300 for increasing and/or decreasing an EGR differential between a first compressor associated with a first turbocharger and a second compressor associated with a second turbocharger. At 302 the method includes estimating and/or measuring engine operating conditions including, for example, torque demand, ignition spark timing, air-fuel ratio, engine speed, catalyst temperature, fuel type, etc. At 304, a desired EGR percentage and a desired EGR differential may be determined based on the estimated/measured engine operating conditions. This may include determining an amount, flow, and/or temperature of exhaust gas to be recirculated to an engine intake (for example, from one or more parallel exhaust passages to respective parallel intake passages in a split engine system). This may further include determining an amount of exhaust gas to be delivered, via a cross-over loop, from an EGR loop that is associated with a first turbocharger to a compressor that is associated with a second turbocharger and is not associated with a separate EGR loop. Additionally, this may further include determining whether the desired amount of EGR is to be provided as LP-EGR flow, HP-EGR flow, or a combination thereof.

At 306, the method includes determining whether an adequate surge margin exists based on, for example, estimated engine operating conditions, the EGR percentage and/or the EGR differential. In one example, the method may include examining an engine manifold pressure and an air flow downstream from the compressor that is associated with the first turbocharger and the EGR loop. If the manifold pressure exceeds a pressure threshold associated with a surge condition, and the air flow is below an air flow threshold associated with a surge condition, then the method may determine that an adequate surge margin does not exist (i.e., a surge condition exists or is likely to exist). In this case, at 308 the method includes determining a decreased EGR differential to achieve an adequate surge margin and maintain the desired EGR percentage. At 310, the decreased EGR differential is obtained by opening the cross-over valve to increase the EGR exhaust gas flow to the second compressor, to thereby achieve an adequate surge margin while maintaining the desired EGR percentage. It will be appreciated that adjusting the EGR differential to increase the EGR exhaust gas flow to the second compressor, and thereby achieve an adequate surge margin while maintaining the desired EGR percentage, may also include adjusting a position of one or more other EGR valves (such as LP-EGR valves, HP-EGR valves, and/or EGR throttle valves) to achieve the desired amount of EGR exhaust gas flow.

In one example of a spark ignition internal combustion split-engine system, the engine includes a first turbocharger having a first compressor and an associated LP-EGR loop, and a second turbocharger having a second compressor, the second turbocharger not associated with a separate LP-EGR loop. A cross-loop loop couples the LP-EGR loop associated with the first turbocharger to a parallel intake passage upstream of the second compressor associated with the second turbocharger. In this example, the engine is operated at an engine speed of 1500 RPM, with a mean effective pressure (BMEP) of 13 bar (1.3 MPa), and an EGR percentage of 15%. In a first example under these operating conditions, the entire amount of EGR exhaust gas required to achieve a 15% EGR percentage is provided from the LP-EGR loop solely to the first compressor and first turbocharger. In other words, in this example there is no EGR exhaust gas flowing through the cross-over loop to the second turbocharger compressor, and all required EGR exhaust gas is delivered to the engine intake manifold through the first compressor. In this first example, the first compressor may experience a periodic surge condition and associated unstable operation, as exhibited by a pressure ratio across the first compressor coupled with a mass flow rate in the vicinity of the compressor that yield a surge condition.

In a second example under the above operating conditions, the amount of EGR exhaust gas required to achieve a 15% EGR percentage is provided through both the first compressor and the second compressor via diverting at least some of the EGR exhaust gas from the EGR loop through the cross-over loop to the second compressor. For example, under one set of engine operating conditions, both the first compressor and the second compressor may receive 7.5% EGR exhaust gas, for a total of 15% EGR exhaust gas delivered to the intake manifold. In other words, in this second example the EGR differential is reduced as compared to the first example above. Accordingly, because the amount of EGR received by the first compressor is 7.5% as opposed to 15%, the first compressor avoids a surge condition and operates in a stable condition, as exhibited by a pressure ratio across the first compressor coupled with a mass flow rate adjacent to the compressor that enable stable operation by the compressor. As noted above, other engine operating parameters, such as an engine manifold pressure (MAP), may be utilized to determine whether a surge condition exists or is likely to exist.

It will be appreciated that as the EGR differential is adjusted, pressure fluctuations and/or transients may occur in the engine intake manifold. Accordingly, other engine operating parameters, such as spark timing, fuel injection timing, air-fuel ratio (AFR), etc., may be adjusted to correct for any pressure fluctuations and/or transients in the engine intake manifold. With reference now to FIG. 3, at 312 the method then includes adjusting engine operating parameters to compensate for the change in the EGR differential. For example, adjusting flow through the cross-over tube may dynamically change the instantaneous amount of EGR delivered to the intake manifold and thus the cylinders, until the compressor speeds and flowrates stabilize to their steady-state values. Such transient EGR flow may cause the EGR rate in the cylinders to temporarily increase and/or decrease. As such, engine parameters, such as spark timing may be adjusted in coordination with the transient EGR rate during the adjusting of EGR flow through the cross-over tube. In one example, spark retard may be temporarily retarded during opening of the cross-over valve 214, and vice versa.

Returning to FIG. 2, if the compressor surge margin is determined to be adequate at 306, then at 314 the method includes determining whether an air intake temperature is less than an intake temperature threshold. As noted above, when the engine is operated in low ambient temperature conditions, water vapor condensation may form on internal surfaces of engine components, such as an EGR air cooler, when those surfaces are cooler than the saturation temperature (dew point) of the exhaust gas. In one example, an intake temperature threshold may be determined empirically through testing the engine under various operating conditions, and identifying for each of the conditions an intake temperature threshold that corresponds with condensation accumulation on surfaces of one or more engine components.

If the method determines at 314 that the ambient air temperature is less than an intake temperature threshold, and with reference now to FIG. 3, at 316 the method includes determining an increased EGR differential to achieve an increased air intake temperature that exceeds the intake temperature threshold, and to maintain the desired EGR percentage. At 318, the increased EGR differential is obtained by partially or fully closing the cross-over valve to decrease or eliminate the EGR exhaust gas flow to the second compressor, and to thereby achieve an increased air intake temperature while maintaining the desired EGR percentage. It will be appreciated that, in addition to or instead of the analyzing an air intake temperature, the method may also utilize other engine operating conditions and/or environmental factors, such as relative humidity of ambient air or an air/exhaust gas mixture, to estimate whether a condensation condition exists or is likely to exist.

As noted above, it will be appreciated that adjusting the EGR differential to decrease the EGR exhaust gas flow to the second compressor, and thereby increase the EGR differential and increase the air intake temperature while maintaining the desired EGR percentage, may also include adjusting a position of one or more other EGR valves (such as LP-EGR valves, HP-EGR valves, and/or EGR throttle valves) to achieve the desired amount of EGR exhaust gas flow. Further and also as noted above, it will be appreciated that as the EGR differential is adjusted, pressure fluctuations and/or transients may occur in the engine intake manifold. Accordingly, other engine operating parameters, such as spark timing, fuel injection timing, air-fuel ratio (AFR), etc., may be adjusted to correct for any pressure fluctuations and/or transients in the engine intake manifold. In the present case, at 312 the method may include adjusting engine operating parameters to compensate for the increase in the EGR differential.

Returning to FIG. 2, if the air intake temperature is determined to be greater than or equal to the intake temperature threshold at 314, then at 320 the method includes determining whether a compressor outlet temperature exceeds an outlet temperature threshold. As noted above, components of a compressor may be damaged when the compressor is operated at a temperature exceeding a temperature threshold. In one example, the compressor outlet temperature may be estimated or measured to determine whether it exceeds an outlet temperature threshold that is associated with damage to compressor components.

With reference now to FIG. 3, if the compressor outlet temperature is determined to exceed the outlet temperature threshold, then at 322 the method includes determining a decreased EGR differential to achieve a compressor outlet temperature that is less than the outlet temperature threshold, and to maintain the desired EGR percentage. At 324, the decreased EGR differential is obtained by opening the cross-over valve to increase the EGR exhaust gas flow to the second compressor, and correspondingly decrease the amount of heated EGR exhaust gas flow to the first compressor. In this manner, the temperature of the ambient intake air/EGR mixture delivered to the first compressor inlet will be decreased, which accordingly decreases the temperature of the compressed ambient intake air/EGR mixture at the first compressor outlet, and thereby achieves a lower compressor outlet temperature while maintaining the desired EGR percentage.

In one example of a spark ignition internal combustion split-engine system, the engine includes a first turbocharger having a first compressor and an associated LP-EGR loop, and a second turbocharger having a second compressor, the second turbocharger not associated with a separate LP-EGR loop. A cross-over loop couples the LP-EGR loop associated with the first turbocharger to a parallel intake passage upstream of the second compressor associated with the second turbocharger. In this example, the engine is operated at an engine speed of 3000 RPM, with a mean effective pressure (BMEP) of 13 bar (1.3 MPa), and an EGR percentage of 15%. The first compressor has an operating temperature limit of 150° C., above which damage to compressor components may occur. In a first example under these operating conditions, the entire amount of EGR exhaust gas required to achieve a 15% EGR percentage is provided from the LP-EGR loop solely to the first compressor and first turbocharger. In other words, in this example there is no EGR exhaust gas flowing through the cross-over loop to the second turbocharger compressor, and all required EGR exhaust gas is delivered to the engine intake manifold through the first compressor. In this first example, the first compressor experiences a compressor outlet temperature of 184° C., exceeding its 150° C. operating temperature limit.

In a second example under the above operating conditions, the amount of EGR exhaust gas required to achieve a 15% EGR percentage is provided through both the first compressor and the second compressor via diverting at least some of the EGR exhaust gas from the EGR loop through the cross-over loop to the second compressor. In this second example, the first compressor experiences a compressor outlet temperature of 130° C., below its 150° C. operating temperature limit.

As noted above, it will also be appreciated that adjusting the EGR differential to increase the EGR exhaust gas flow to the second compressor, and thereby decrease the EGR differential and decrease the compressor outlet temperature while maintaining the desired EGR percentage, may also include adjusting a position of one or more other EGR valves (such as LP-EGR valves, HP-EGR valves, and/or EGR throttle valves) to achieve the desired amount of EGR exhaust gas flow. Further and also as noted above, it will be appreciated that as the EGR differential is adjusted, pressure fluctuations and/or transients may occur in the engine intake manifold. Accordingly, other engine operating parameters, such as spark timing, fuel injection timing, air-fuel ratio (AFR), etc., may be adjusted to correct for any pressure fluctuations and/or transients in the engine intake manifold. In the present case, at 312 the method may include adjusting engine operating parameters to compensate for the increase in the EGR differential.

It will also be appreciated that, in the absence of a surge condition or a compressor outlet temperature exceeding an outlet temperature threshold, all of the EGR exhaust gas may be delivered to the first compressor to maintain a higher overall ambient air/EGR exhaust gas mixture temperature, and thereby minimize the likelihood of condensation occurring within the engine. In other words, the EGR differential may be decreased only when the manifold pressure exceeds a pressure threshold and the air flow is below an air flow threshold, or when the first compressor outlet temperature exceeds an outlet temperature threshold.

Note that the example control and estimation routines included herein can be used with various engine and/or vehicle system configurations. The specific methods and routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a twin-turbocharger engine, comprising:
   increasing an EGR flow differential between EGR flow to a first compressor and to a second compressor via closing a cross-over valve responsive to an intake temperature that corresponds with condensation accumulation; and
   decreasing the EGR flow differential between EGR flow to the first and to the second compressor via opening the cross-over valve responsive to a surge condition.

2. The method of claim 1, wherein the twin-turbocharger engine includes a first cylinder bank and a second cylinder bank.

3. The method of claim 1, wherein the EGR flow differential is determined based on spark timing.

4. The method of claim 1, wherein the EGR flow differential is determined based on air-fuel ratio.

5. The method of claim 1, wherein the EGR flow differential is determined based on engine speed.

6. The method of claim 1, wherein increasing the EGR flow differential further comprises reducing exhaust gas flow to the second compressor.

7. The method of claim 1, wherein decreasing the EGR flow differential further comprises increasing exhaust gas flow to the second compressor.

8. The method of claim 1, further including:
   estimating a manifold pressure;
   estimating an air flow downstream from the first compressor; and
   if the manifold pressure exceeds a pressure threshold and the air flow is below an air flow threshold, then decreasing the EGR flow differential between EGR flow to the first and second compressors via opening the cross-over valve.

9. The method of claim 8, wherein if the manifold pressure is below the pressure threshold or the air flow exceeds the air flow threshold, then increasing the EGR flow differential between EGR flow to the first and second compressors via closing the cross-over valve.

10. The method of claim 1, further comprising:
    estimating a first compressor outlet temperature; and
    if the first compressor outlet temperature exceeds an outlet temperature threshold, then decreasing the EGR flow differential between EGR flow to the first and second compressors via opening the cross-over valve.

11. The method of claim 10, further comprising decreasing the EGR flow differential between the EGR flow to the first and second compressors only when the surge condition exists or the first compressor outlet temperature exceeds the outlet temperature threshold via opening the cross-over valve.

12. The method of claim 1, further comprising adjusting engine operating parameters to compensate for transient changes in the EGR flow differential.

13. A method of operating a cross-over valve of an engine, comprising:
    opening the cross-over valve if a manifold pressure exceeds a pressure threshold and an air flow is below an air flow threshold, the cross-over valve positioned in a low-pressure EGR cross-over loop fluidically coupling EGR upstream of a first and a second engine turbocharger compressor;
    closing the cross-over valve if the manifold pressure is below the pressure threshold or the air flow exceeds the air flow threshold; and
    adjusting engine operating parameters to compensate for the opening and closing of the cross-over valve generating changes in an EGR flow differential between EGR flow to the first compressor and to the second compressor.

14. The method of claim 13, wherein opening the cross-over valve includes increasing exhaust gas flow through the cross-over loop.

15. The method of claim 13, wherein closing the cross-over valve includes decreasing exhaust gas flow through the cross-over loop.

16. The method of claim 13, further comprising: estimating a compressor outlet temperature; and if the compressor outlet temperature exceeds an outlet temperature threshold, then increasing exhaust gas flow through the cross-over loop by opening the cross-over valve.

17. The method of claim 16, further comprising opening the cross-over valve only when the manifold pressure exceeds the pressure threshold and the air flow is below the air flow threshold, or the compressor outlet temperature exceeds the outlet temperature threshold.

18. The method of claim 13, wherein closing the cross-over valve includes partially closing the cross-over valve to adjust an amount of exhaust gas delivered to the EGR cross-over loop.

19. The method of claim 13, wherein the EGR cross-over loop is fluidically coupled to an EGR loop, the EGR loop is fluidically coupled to a first intake passage upstream from the first compressor, and opening the cross-over valve includes delivering exhaust flow through the EGR cross-over loop to a second intake passage upstream of the second compressor.

* * * * *